(12) United States Patent
Yu

(10) Patent No.: US 9,720,313 B2
(45) Date of Patent: Aug. 1, 2017

(54) IMAGING PLATE FOR PROJECTION

(71) Applicant: Chu-Yih Yu, New Taipei (TW)

(72) Inventor: Chu-Yih Yu, New Taipei (TW)

( * ) Notice: Subject to any disclaimer, the term of this patent is extended or adjusted under 35 U.S.C. 154(b) by 0 days.

(21) Appl. No.: 14/949,903

(22) Filed: Nov. 24, 2015

(65) Prior Publication Data

US 2017/0146899 A1    May 25, 2017

(51) Int. Cl.
*G03B 21/62* (2014.01)

(52) U.S. Cl.
CPC ................... *G03B 21/62* (2013.01)

(58) Field of Classification Search
CPC ....................................... G03B 21/62
USPC ........................ 359/460, 443, 459
See application file for complete search history.

(56) References Cited

U.S. PATENT DOCUMENTS

| | | | | |
|---|---|---|---|---|
| 5,959,711 A * | 9/1999 | Silverstein | ............... | G02B 6/08 349/110 |
| 7,630,130 B2 * | 12/2009 | Yamauchi | ............. | G03B 21/60 359/443 |
| 2002/0186465 A1 * | 12/2002 | DeSanto | ................. | G02B 6/08 359/460 |
| 2006/0176555 A1 * | 8/2006 | Kuo | ......................... | G02B 6/06 359/460 |
| 2007/0139765 A1 * | 6/2007 | Daniel | ..................... | G02B 6/08 359/443 |
| 2008/0285125 A1 * | 11/2008 | Lee | .......................... | G02B 6/08 359/449 |
| 2008/0297726 A1 * | 12/2008 | Rodriguez, Jr. | ........ | G03B 21/14 353/13 |

\* cited by examiner

*Primary Examiner* — Christopher Mahoney

(57) ABSTRACT

An imaging plate for projection, the imaging plate comprising an impermeable plate and a projecting device disposed in said one surface of the plate in a certain distance, wherein the projecting device is capable of projecting light and image; the plate having a plurality of cylinder through holes disposed on both surface thereof; wherein the cylinder through holes are filled with transparent pillars, one end of said pillar defined an input end which receives the light and image from the projecting device and then guides them to an output end thereof; wherein an inner wall of the cylinder through holes comprises a light reflective surface; wherein the both input end and output end of transparent pillar are parallel to the rear and front surface of the plate.

8 Claims, 9 Drawing Sheets

IMAGING PLATE FOR PROJECTION

CROSS REFERENCE TO RELATED APPLICATIONS

This application is a continuation-in-part of my copending application Ser. No. 13/902,978 filed May 28, 2013.

FIELD OF THE INVENTION

The present invention relates to an imaging plate for projection, particularly to an imaging plate for projection with low cost, simple setting and few affected by external climate.

BACKGROUND OF THE INVENTION

TV wall is a common display device for promotion, which is a large scale LED display installed on the wall of building, the commercial images or videos could be shown on the LED display, with the high image quality of LED screen, said commercial broadcasted on the TV wall could achieve outstanding promotion effect.

However, above-mentioned TV wall is also with disadvantages such as high production cost, numerous power consumption, less visible in daylight, large scale and heavy weights complex installation, affection to the appearance of the building or wall, malfunction due to nature climate, great number of maintenance cost, and limited application field restricted by the size of the building or wall.

To solve aforementioned disadvantages, a display device with low production cost, easy to install and maintain, naturally involving with the appearance of the building or wall, and low malfunction rate in nature climate is required.

SUMMARY OF THE INVENTION

Present invention provides a plate type image display device with low production cost, easy to install and maintain, naturally involving with the appearance of the building or wall, and low malfunction rate in nature climate, which comprises: an imaging plate for projection, the imaging plate (100) comprising: an impermeable plate (1) with a certain thickness defined a front surface and a rear surface corresponding to the front surface, wherein the front surface and the rear surface are in parallel; a projecting device (2) disposed in said one surface of the plate (1) in a certain distance, wherein the projecting device (2) is capable of projecting light and image;

the plate (1) having a plurality of cylinder through holes (11) disposed on both surface thereof; wherein the cylinder through holes (11) are filled with transparent pillars (12), one end of the transparent pillar (12) defined an input end (12a) which receives the light and image from the projecting device (2) and then guides them to an output end (12b) thereof; wherein an inner wall of the cylinder through holes (11) comprises a light reflective surface (13);

Wherein the both input end and output end of transparent pillar (12) are parallel to the rear and front surface of the plate.

Wherein the light reflective surface (13) is formed by polishing treatment to achieve a polishing effect.

Wherein the light reflective surface (13) is covered by a metal film (14) with light reflecting effect.

Wherein the transparent pillar (12) is made of light permeable plastic.

Wherein the transparent pillar (12) is made of light permeable glass.

Wherein the diameter of the cylinder hole (11) is 0.1 to 5 mm; wherein the plate (1) is made of metal or plastic; wherein the thickness of the plate is 1 to 3 mm.

Wherein the number of the through hole (11) on the plate (1) is above 20000, and the distance between each through holes (11) is 0.5 to 10 mm. Comparing with conventional display device.

Compared with the prior art, the present invention has the beneficial effects are that By using the plate (1) and projecting device (2), clear displaying effect in is appeared, furthermore, the plate (1) can be used in outdoor and will not be affected by the weather; the projecting device (2) is placed in the building or behind the plate (1), thereby achieving widely using the imaging plate (100) in different situations.

By using the cylinder holes (11) and the transparent pillar (12), the plate (1) looks just like a normal wall, the projecting device could not be seen from the other side of the plate (1) before the projecting device (2) is activated, once the projecting device (2) is activated and the light is projected on the surface of said plate, the light would be guided to the other side of the plate (1) through, said pillar (12), thus, the image projected, by the projecting device (2) would be shown on the surface of said plate (1), to achieve pertinent display effect with LED screen.

By using the light reflective surface (13) or the metal film (14) on the inner wall of the cylinder holes (11), the light projected in the cylinder holes (11) can be concentrated in the pillar (12) to reduce the light losses when the light is guiding through, thus, the color differential between the image projected by projecting device (2) and the image shown on the surface of the plate (1) is minimized, therefore increase the color reproduction of present invention.

The material of plate (1) can be used in metal or plastic, thereby achieving widely applying for different demands.

DETAILED DESCRIPTION OF THE INVENTION

Figure 1:
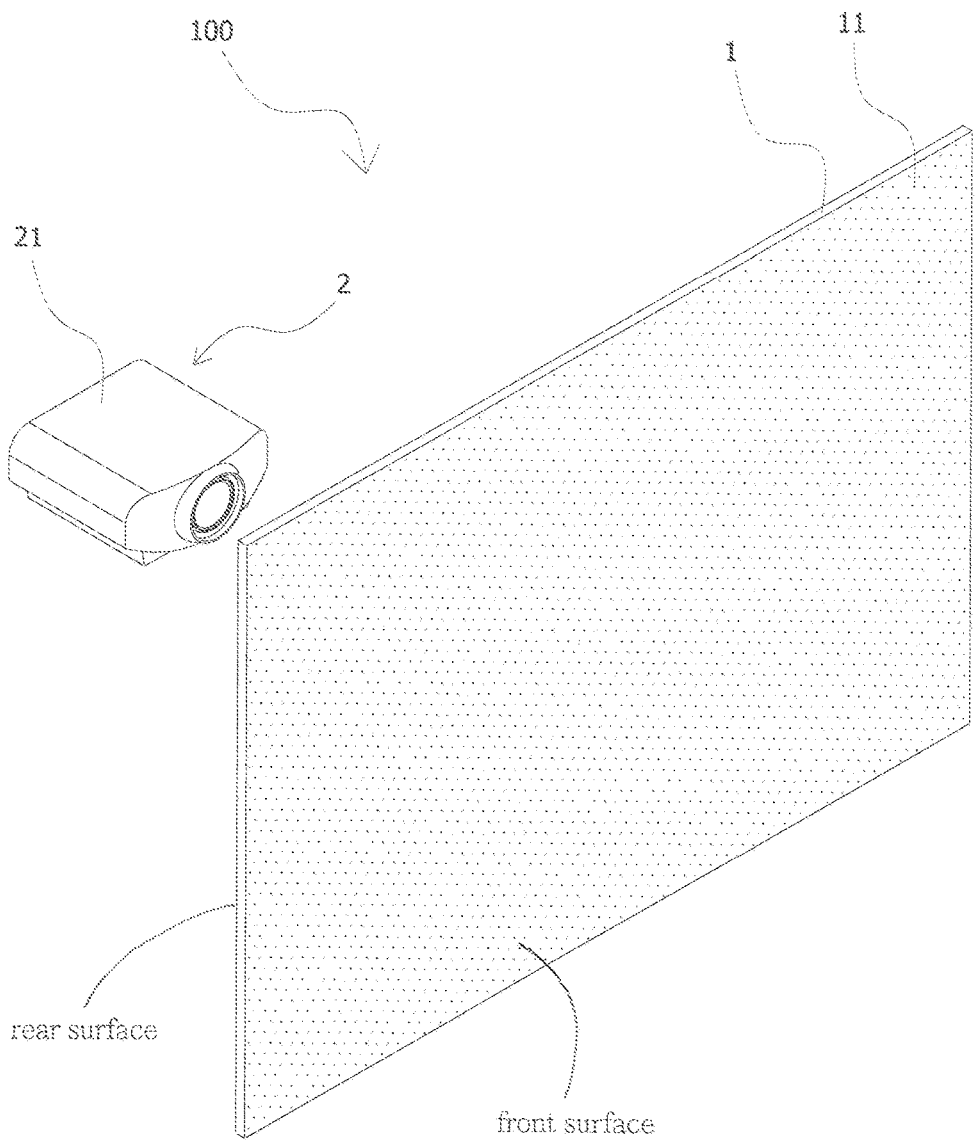
FIG. 1 is a schematic view of the present invention.
Figure 2:
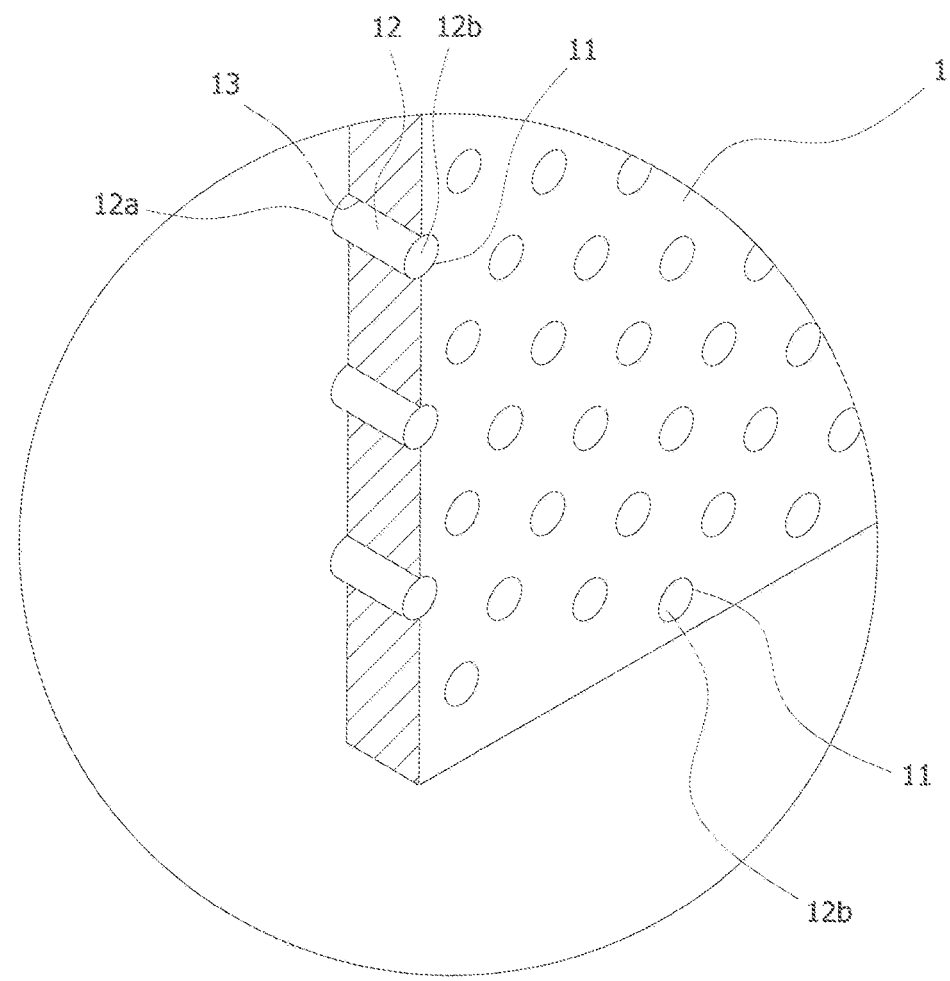
FIG. 2 is a partial enlarge view of FIG. 1.
Figure 3:
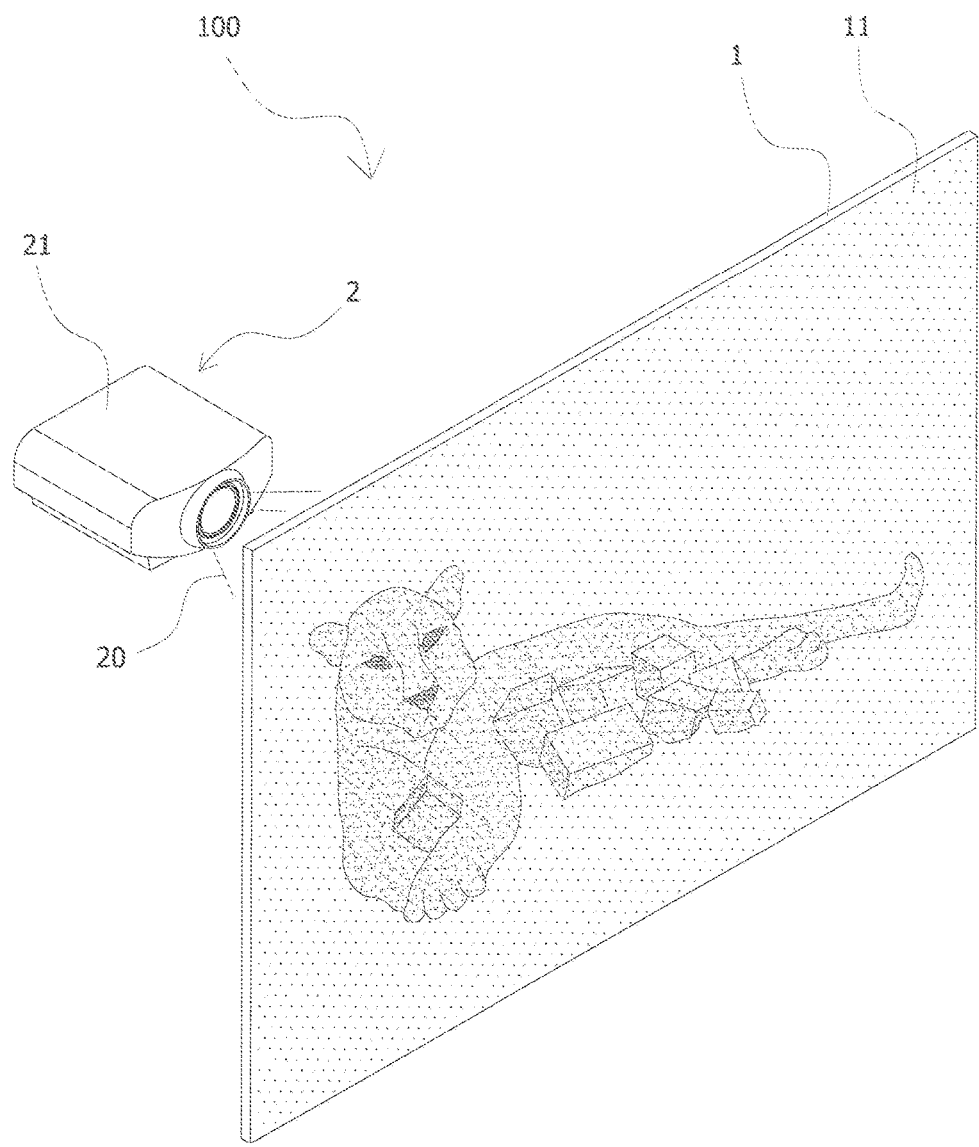
FIG. 3 is an implemented view of the present invention.

Detailed description of present invention is as following:
Referring to FIGS. 1-3, which discloses a plate type image display device, which comprises: an imaging plate for projection, the imaging plate (100) comprising:
an impermeable plate (1) with a certain thickness defined a front surface and a rear surface corresponding to the front surface, wherein the front surface and the rear surface are in parallel;

a projecting device (2) disposed in said one surface of the plate (1) in a certain distance, wherein the projecting device (2) is capable of projecting light and image;

the plate (1) having a plurality of cylinder through holes (11) disposed on both surface thereof; wherein the cylinder through holes (11) are filled with transparent pillars (12), one end of said pillar (12) defined an input end (12a) which receives the light and image from the projecting device (2) and then guides them to an output end (12b) thereof; wherein an inner wall of the cylinder through holes (11) comprises a light reflective surface (13); wherein the both input end and output end of transparent pillar (12) are parallel to the rear and front surface of the plate.

Said projecting device (2) is a projector (21), the plate (1) looks just like a normal wall before using, when the projector (21) disposed behind the plate (1) is activated, the light (20) is projected to the rear surface of the plate (2), proceeded to the transparent pillar (12) of the through hole (11), and then guided to the front surface of the plate (1) to assemble a plurality of light spots and form the image, thus, the present invention is more like a hidden display screen, when the plate (1) is installed on the outside of the building or wall, the plate (1) becomes the surface layer of the building or wall, once the projecting device (2) starts projecting, the plate (1) soon becomes a commercial display board, the display effect of present invention would be better when using in the night.

The transparent pillar (12) is made of permeable plastic material such as Polyethylene, Polypropylene, and Polyvinyl Chloride, the production method of making said pillar (12) is to heat and melt said plastic material into liquid, and inject or press the liquid into cylinder through holes (11). Wherein the transparent pillar (12) is formed by heating plastic material to the liquid and pouring into the cylinder through hole (11) until the liquid plastic material is cooled down and become solid, the making method is simple, quick and cheap, thereby achieving reducing the plate price.

The both input end and output end of transparent pillar (12) are parallel to the rear and front surface of the plate, thereby achieving manufacturing easily and stacking the plate (1) conveniently.

The material of the pillar (12) can also use light permeable crystal transparent glass that has better light permeability and light guiding effect, but, whether the plastic or glass, both materials as the transparent pillar (12) have good water and vapor resistance.

Figure 4:
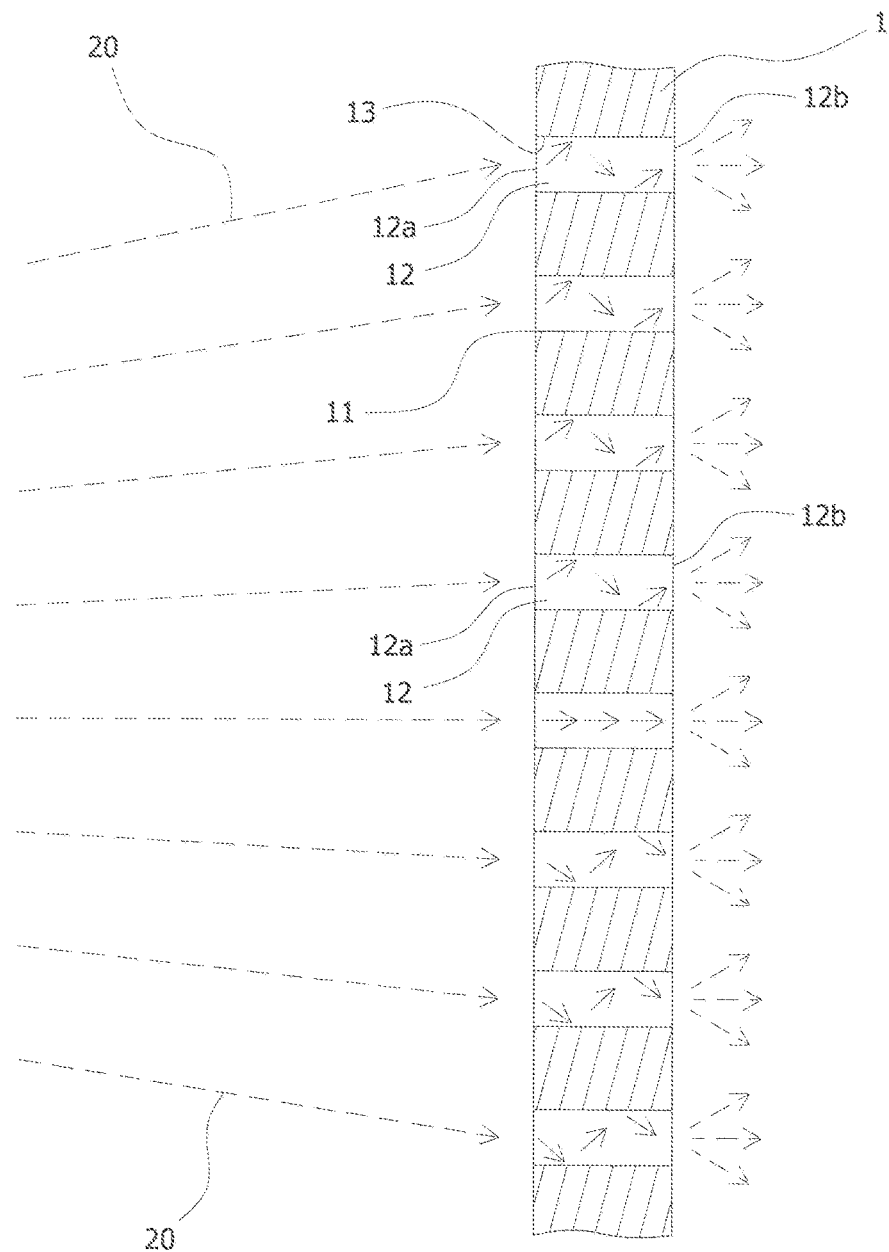
FIG. 4 is a cross section view showing projecting and guiding light and image of the present invention.

As shown in FIG. 4, the inner wall of the cylinder through holes (11) comprises a light reflective surface (13), thus, when the light projected from the projecting device (2) enters into the transparent pillar (12), the light will be reflected by the reflective surface (13) and guided to the output end (12b) for displaying bright and concentrated light spot and avoiding, image distortion, furthermore, over 20000 holes are deployed on single unit area (ex: Length 1.5 m, width 2.5 m) of said plate (1), thus, plurality of light spots appear when said projecting device (2) is projecting light.

Said plate (1) is durable and widely applicable which is capable of using indoor and outdoor, when using outdoor, the quality of displayed image is stable and clear, and is being less affected by outrage weather, and defective pixel problem would not be occurred. Furthermore, the power consumption of present invention is only 6~10% of conventional LED display, and complex maintenance procedure is not required for present invention, therefore, the deploying and maintenance cost of present invention is much lower than prior art.

Figure 5:
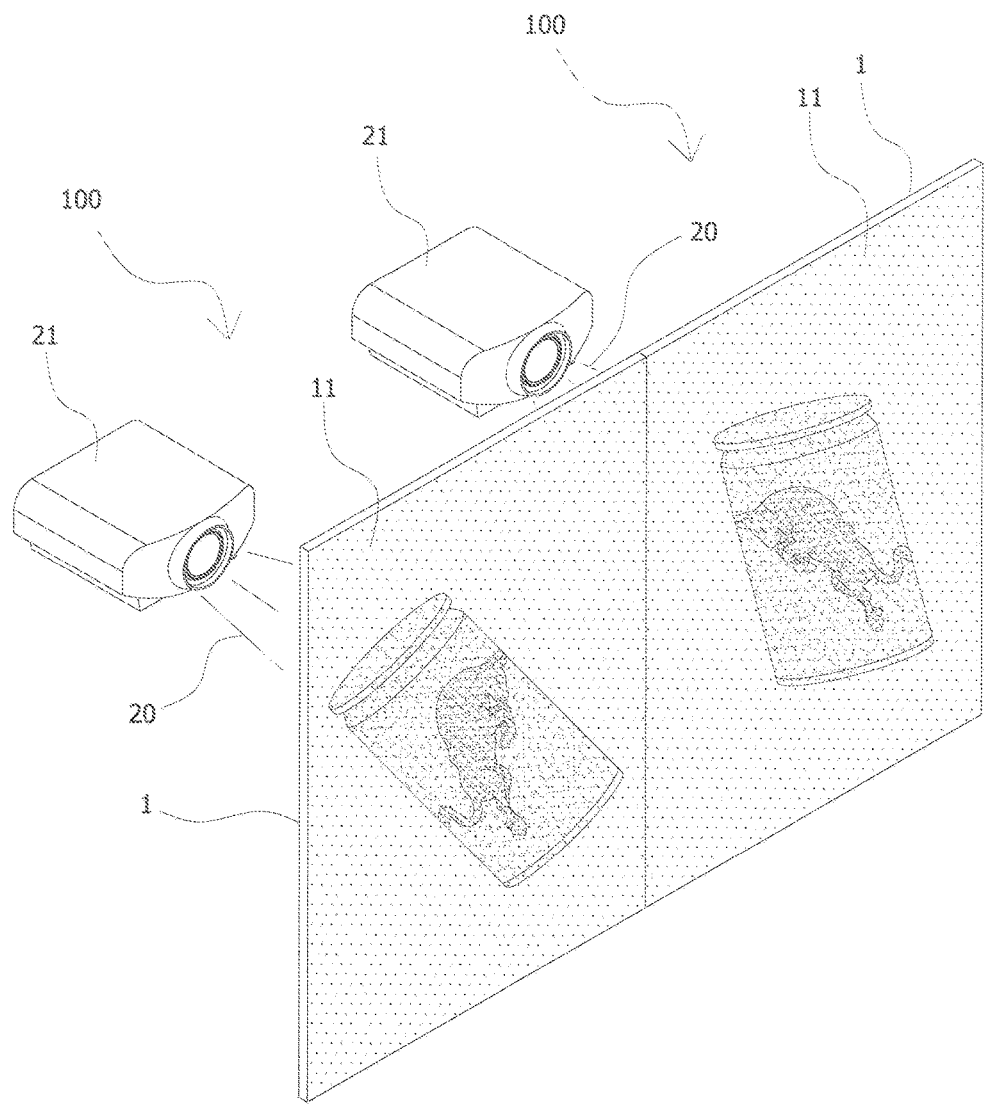
FIG. 5 is an implemented schematic view showing multiple plates for projection.

As shown in FIG. 5, the imaging plate (100) is composed of one projecting device (2) and one plate (1), however, multiple plates (1) and projecting devices (2) could be applied for the demand of large scale screen.

Figure 6:
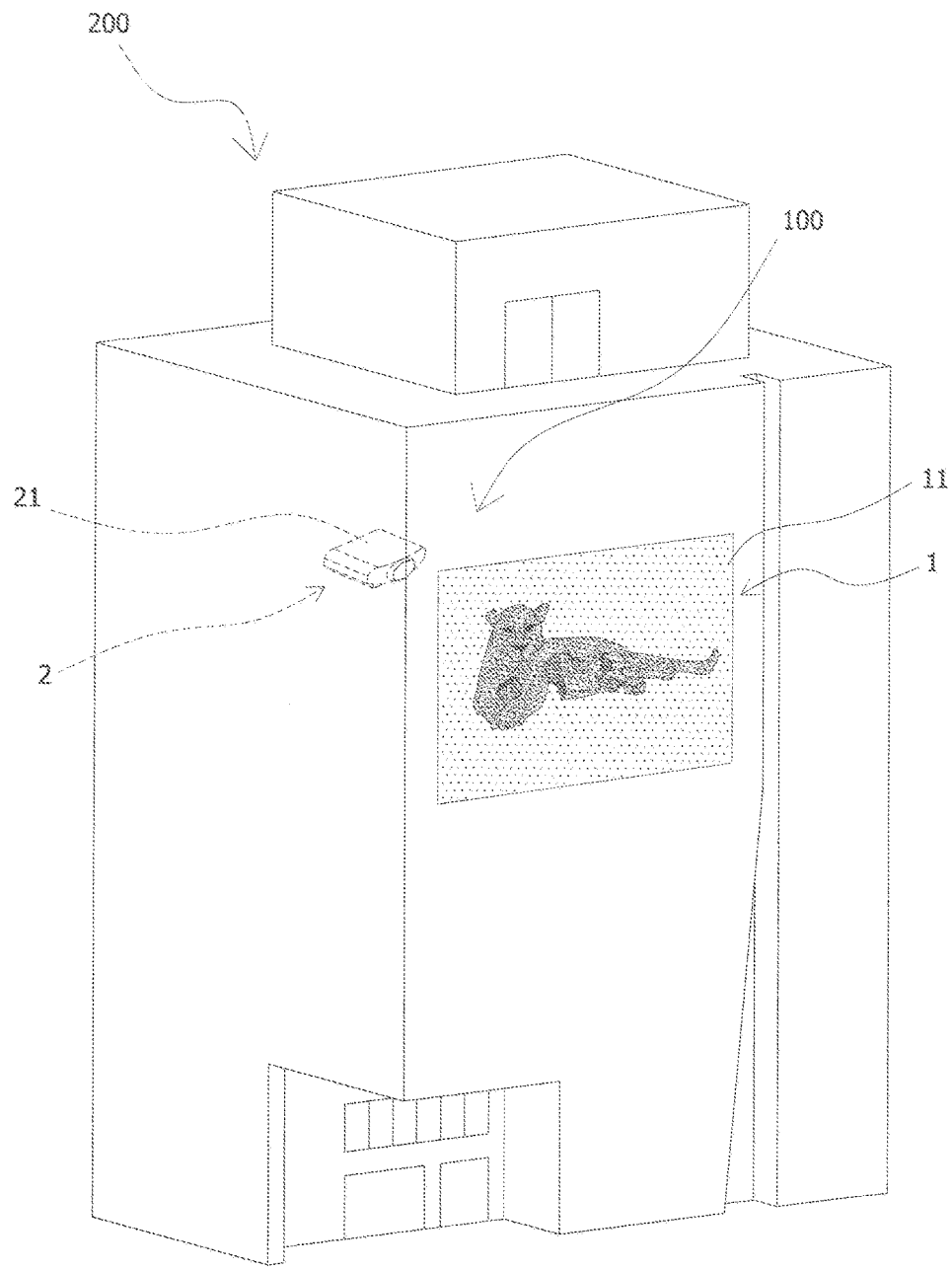
FIG. 6 is a schematic view showing the imaging plate for projection applied on the building.
Figure 7:
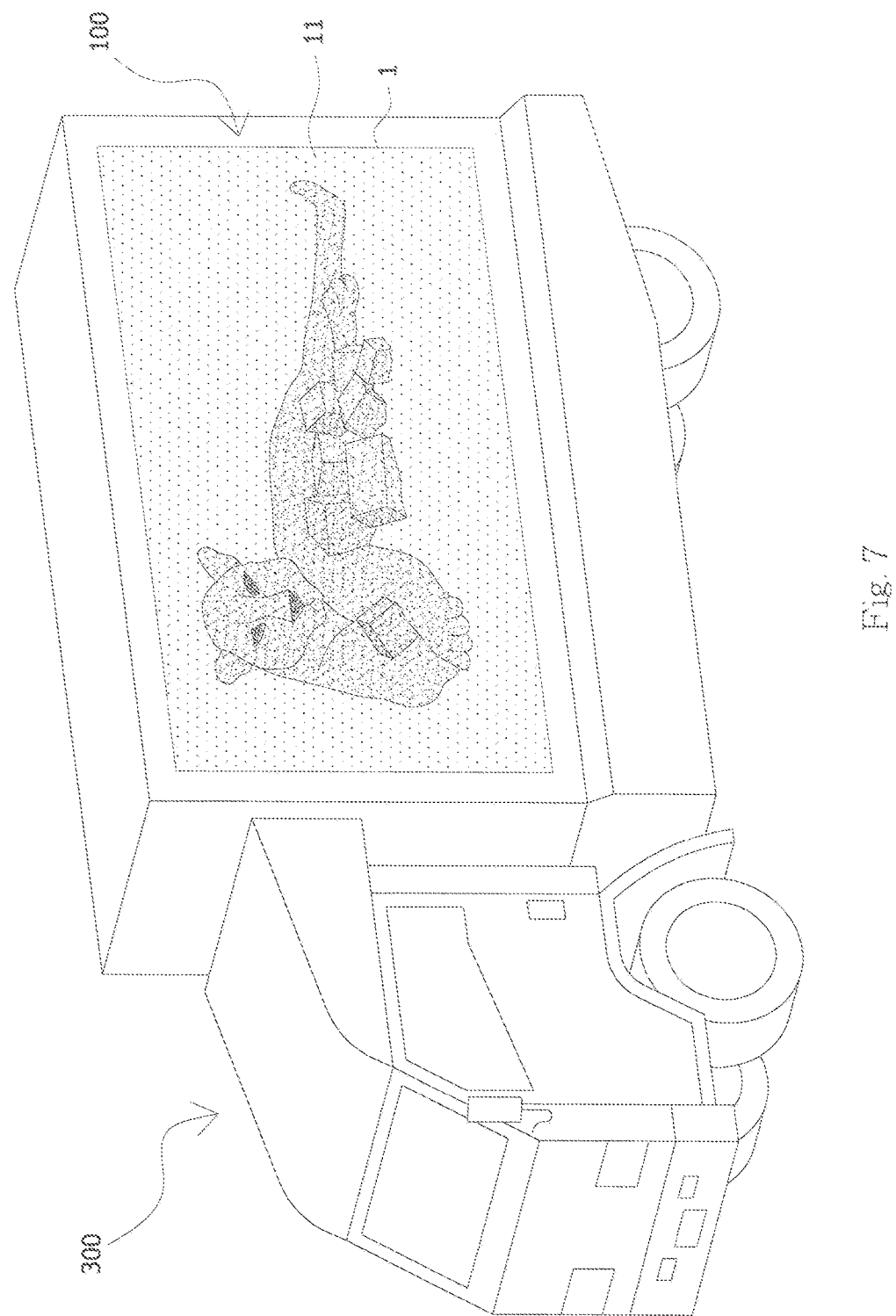
FIG. 7 is a schematic view showing the imaging plate for projection applied on the vehicle.
Figure 8:
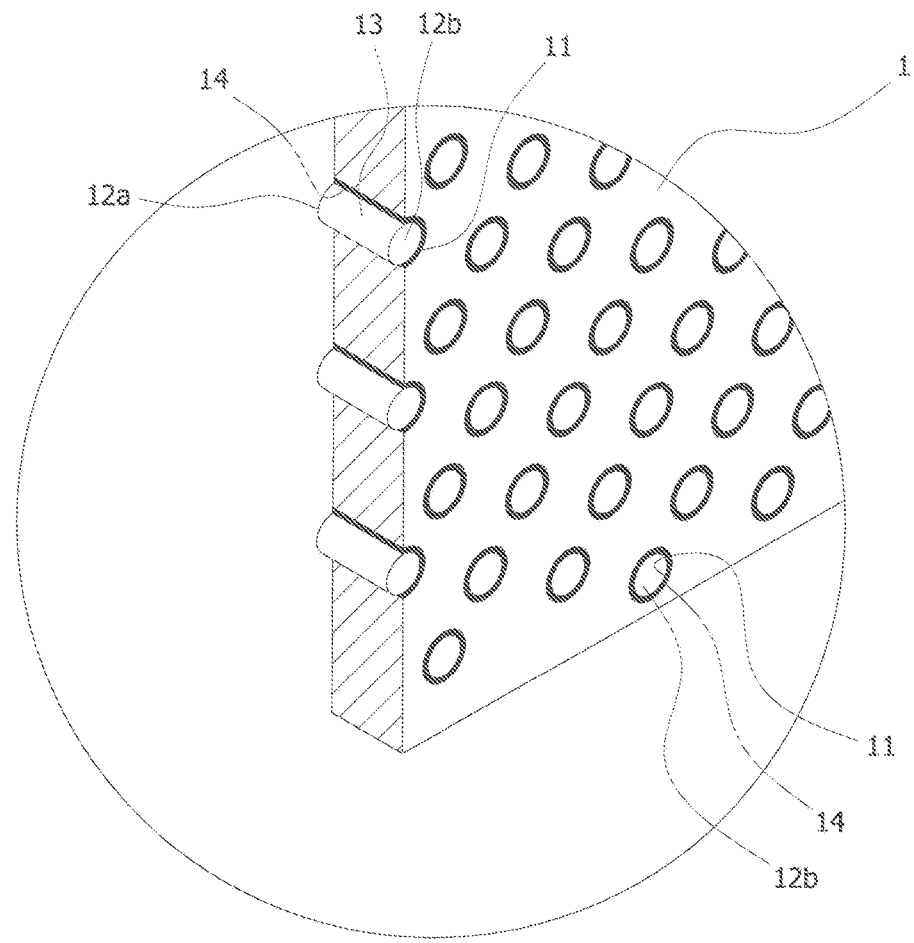
FIG. 8 is another partial enlarge view of FIG. 1.

As shown in FIGS. 6 and 7, present invention could also be applied on the building (200) or vehicle (300), and the size of said plate (1) is adjustable for user's need, when the display screen is assembled by multiple plates (1), there would be seamless in the connecting part, also match the original display ratio of the image projected from the display device (2), the brightness and display area of the plate (1) could also correspond to the size and brightness of the image projected by the display device (2) without affecting the appearance of the building (200) or vehicle (300), furthermore, the appearance of the plate (1) installed on the surface of the building (200) or vehicle (300) could involve in its appearance, and become a part of the structure of the building (200) or vehicle (300) instilled on.

The diameter of each said cylinder through hole (11) is 0.1 to 5 mm, which is adjustable for corresponding to the size of the original image from the projecting device (2).

The thickness of the plate (1) is 1 mm, if the thickness is below 1 mm, the quality of the image may be affected, however, if the thickness of the plate (1) is increased, although the image quality will not be affected, the increased weight for the plate (1) may cause moving and installed hardly.

Secondly, said plate (1) is made of metal or plastic, the polishing process could be applied if the plate (1) is made of metal, to upgrade the reflecting rate of the reflective surface (13), thus, a reflective wall is formed to guide the incident light from one to another side of the pillar (12), this method is convenient, fast, cost-low, and shorten the time of production effectively, furthermore, once the pillars (12) are injected, which are tightly attached on the wall of the cylinder holes (11), said reflective surface (13) achieve better protection which makes said reflective surface (13) become more durable from weathering and detaching.

Furthermore, the outside of said reflective surface (13) could be plated with a metal film (14), said metal film (14) could be formed by electroplating, dip plating, spray-coat plating or chemical plating, which are common skill of the field.

Figure 9:
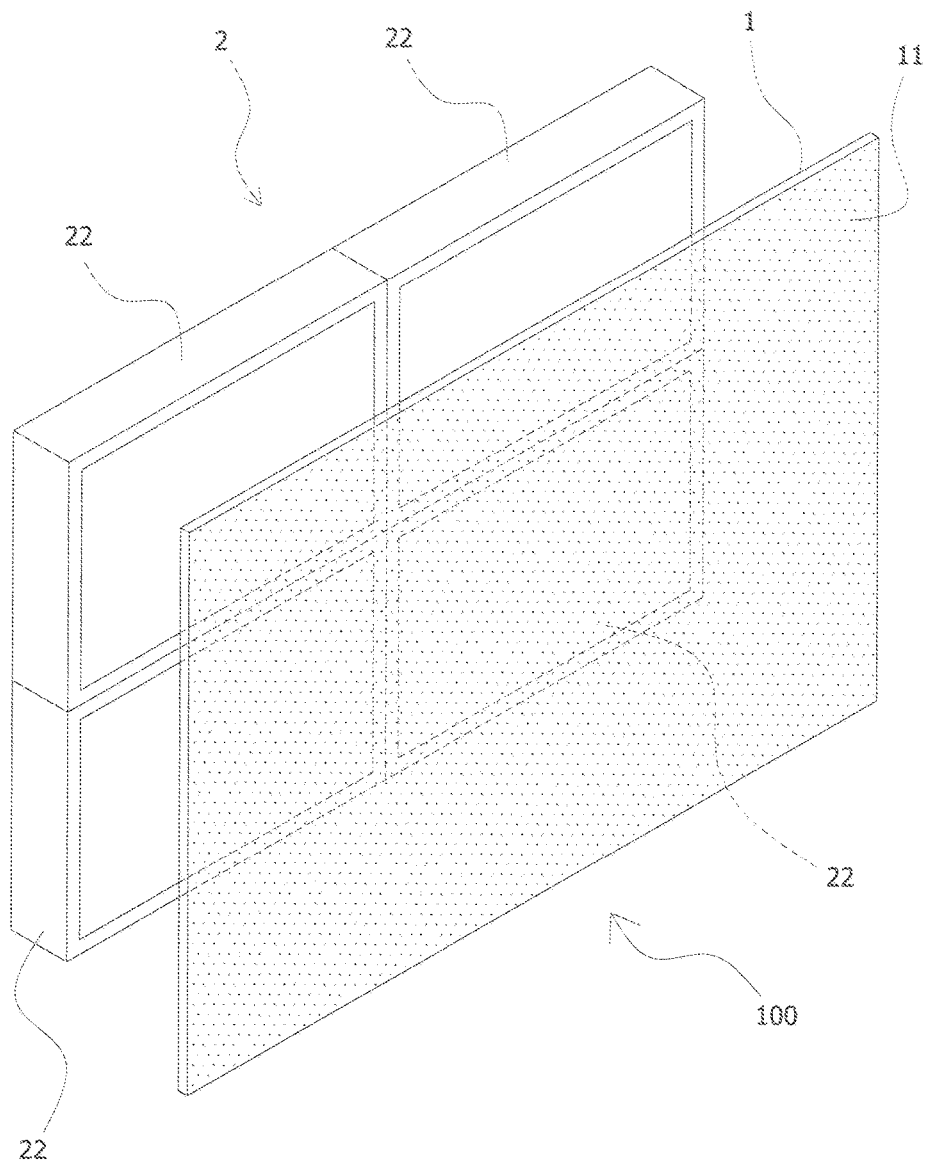
FIG. 9 is an implemented schematic view applied with the vehicle.

Referring to FIG. 9, the projecting device (2) defines a display screen (22), which discloses a large plate (1) combines with multiple display screens (22), the image of said display screens (22) is integrated by video splitter. The type is appropriate in the situation which needs to display large scale images, as description above, present invention is adaptive and convenient in different conditions and places.

The description above with figures of present invention is only the description of preferred embodiment but not the limit of present invention, modifications and variations made by person who has the skill in the field in the scope of present invention, might comprise the characteristic as claimed hereafter.

What is claimed is:

1. An imagining plane for projection, the imaging plate (100) comprising:
    a light-impermeable plate (1) with a certain thickness defined a front surface and a rear surface corresponding to the front surface, wherein the front surface and the rear surface are in parallel, wherein the light-impermeable plate is made of metal;
    a projecting device (2) disposed in one side of the rear surface of the plate (1) in a certain distance, wherein the projecting device (2) is capable of projecting light and image;

the plate (1) having a plurality of cylinder through holes (1) disposed therein; wherein the cylinder through holes (11) are filled with transparent pillars (12), the transparent pillars (12) having one end defining an input end (12*a*) which receives the light and image from the projecting device (2) and then guides them to an output end (12*b*) thereof; wherein an inner wall of the cylinder through holes (11) comprises a light reflective surface (13);

wherein the both input end and output end of the transparent pillar (12) are parallel to the rear and front surface of the plate, thereby forming flat surfaces on both sides of the plate (1).

2. The imaging plate for projection of claim 1, wherein the light reflective surface (13) is formed by polishing treatment to achieve a polishing effect.

3. The imaging plate for projection of claim 1, wherein the light reflective surface (13) is covered by a metal film (14) with light reflective effect.

4. The imaging plate for projection of claim 1, wherein the transparent pillar (12) is make of light permeable plastic.

5. The imaging plate for projection of claim 1, wherein the transparent pillar (12) is made of light permeable glass.

6. The imaging plate for projection of claim 1, wherein the diameter of the cylinder hole (11) is 0.1 to 5 mm.

7. The imaging plate for projection of claim 1, wherein the thickness of the plate is 1 to 3 mm.

8. The imaging plate for projection of claim 1, wherein the number of the through hole (11) on the plate (1) is above 20000, and the distance between each through holes (11) is 0.5 to 10 mm.

* * * * *